United States Patent
Vanier

[11] Patent Number: 6,061,954
[45] Date of Patent: May 16, 2000

[54] COVER FOR CULTIVATING PARTICULARLY BANANAS

[76] Inventor: Henri Marie Vanier, Matouba 97120 Saint-Claude, Guadeloupe, France

[21] Appl. No.: 08/875,166

[22] PCT Filed: Jan. 18, 1996

[86] PCT No.: PCT/FR96/00085

§ 371 Date: Nov. 26, 1997

§ 102(e) Date: Nov. 26, 1997

[87] PCT Pub. No.: WO96/22012

PCT Pub. Date: Jul. 25, 1996

[30] Foreign Application Priority Data

Jan. 19, 1995 [FR] France .................................. 95 00591

[51] Int. Cl.[7] .................................................. A01G 13/02
[52] U.S. Cl. ................................................................ 47/29
[58] Field of Search ............................... 47/29; 428/36.6, 428/64.4, 458

[56] References Cited

U.S. PATENT DOCUMENTS

| | | | |
|---|---|---|---|
| 2,953,870 | 9/1960 | Nelson | 47/29 |
| 4,267,143 | 5/1981 | Roullet | 428/36.6 |
| 4,815,236 | 3/1989 | Tesch | 47/29 |
| 4,829,707 | 5/1989 | Koffler et al. | 47/29 |
| 4,954,379 | 9/1990 | Nishida et al. | 428/64.6 |
| 5,406,746 | 4/1995 | Hoshino | |
| 5,750,267 | 5/1998 | Takase et al. | 428/458 |

FOREIGN PATENT DOCUMENTS

| | | |
|---|---|---|
| 765392 | 6/1934 | France . |
| 2159268 | 6/1973 | France . |

OTHER PUBLICATIONS

Derwent AN-91-284342: JP-A-3-187323 (London, 1991).
Derwent AN 86-215084: JP-A-1-146129 (London, 1986).
Derwent AN 93-144255: AU-D-2,534,792 (London, 1993).
Derwent AN 86-215083: JP-A-61-146128 (London, 1986).
Derwent AN 74-59221V: JP-B-49-027773 (London, 1974).
Cuneen et al., "Does The Colour Of Banana Bags Have An Effect On The Yield Of Bananas And The Climate Inside The Bag", The Banana Bulletin, Aug. 1988 (Australia).
Patent Abstracts of Japan, vol. 18, No. 597 (Nov. 1994): JP-A-6-225649 (Tokyo).

*Primary Examiner*—Michael J. Carone
*Assistant Examiner*—Elizabeth Shaw
*Attorney, Agent, or Firm*—Leydig, Voit & Mayer

[57] ABSTRACT

A cover for cultivating bananas or other plants includes a plastic film having three layers. A central one of the layers is made of an ethylene and vinyl acetate copolymer, and at least one of the layers includes a UV absorber.

20 Claims, 1 Drawing Sheet

COVER FOR CULTIVATING PARTICULARLY BANANAS

FIELD OF THE INVENTION

The invention concerns a cover, principally for growing bananas.

BACKGROUND OF THE INVENTION

There are already covers for sheathing stalks of bananas, consisting of a plastic film in polythene (polyethylene), that enable protection to be provided for the stalk of bananas against insects and against the rubbing of leaves and fruit due to conditions such as bad weather, dust, etc..

But bananas are also sensitive to ultra-violet "B" (UV "B") radiation (280–320 nm) which results in the appearance of blemishes on the banana's skin (black marks) and which causes a disappearance of the chlorophyll (chlorosis). Bananas are also sensitive to infrared (heat) which can cause the same symptoms when the temperature of the fruit exceeds 35° C.

A blue colorant (optalocyanyl blue, ultramarine blue) was then proposed which, introduced into the polythene sleeves, protects the bananas against burns.

However, this blue cover does not allow all the white light to pass and stops a good part of the UV "A", because of its blue colouring. Nevertheless white light and UV "A" are involved in healing injuries due to UV "B". The wavelengths absorbed by the blue colorant are those absorbed by the chlorophyll and are those that the plant needs. In addition, polythene is a material with a negative greenhouse effect that lets all infrared pass: the bananas are thus heated by day and rapidly cooled by night. An increase in the heat transmitted to the stalk at night enables growth to be accelerated by favouring reactions in the dark.

SUMMARY OF THE INVENTION

The invention provides a solution to the above problems by proposing a cover consisting of a multi-layer, plastic film of the type including an outer layer, a central layer and an inner layer, the central layer including an ethylene and vinyl acetate copolymer and at least one of the three layers including at least one light stabilising agent and ultraviolet absorber, for growing bananas.

According to one characteristic of the cover under the invention, the ethylene and vinyl acetate copolymer contains less than 20% by volume, as compared to the total volume of copolymer, of vinyl acetate.

More precisely, the ethylene and vinyl acetate copolymer includes between about 9% and about 19% by volume of vinyl acetate as compared to the total volume the copolymer.

According to a first embodiment of the invention, only the central layer contains the said at least one light stabilising and UV absorbing agent.

According to a second embodiment of the invention, only the outer layer contains the said at least one light stabilising and UV absorbing agent.

According to a third embodiment of the cover of the invention, only the inner layer contains the said at least one light stabilising and UV absorbing agent.

According to a fourth embodiment of the invention, only the outer and central layers contain the said at least one light stabilising and UV absorbing agent.

According to a firth embodiment of the invention, only the inner and central layers contain the said at least one light stabilising and UV absorbing agent.

Under a sixth method of producing the invention, the three layers contain the said at least one light stabilising and UV absorbing agent.

According to a sixth embodiment of the invention, the light stabilising and UV absorbing agent is 2-hydroxy-4-n-octoxy-benzophenone, which is associated to a light stabilising agent, poly-(N-β-hydroxyethyl-2, 2, 6, 6-tetramethyl-4-hydroxy-piperidyl succinate), each in a quantity of 0.1 to 2% by volume as compared to the total volume of copolymer.

According to yet another characteristic of the cover of the invention, the central layer consists in addition of a slip agent such as oleamide.

According to still another characteristic of the cover of the invention, the outer layer is composed of a low density, radical polythene, having a fluidity index less than 1.5 g/cm²/mn and the inner layer is of a low density, radical polythene having a fluidity index greater than 4 g/cm²/mn.

According to an additional characteristic of the cover of the invention, the inner layer contains in addition an anti-condensation agent, such as a mono-oleate glycerol.

In addition, the outer layer contains a slip agent, such as an oleamide and the inner layer a slip agent, such as an amine, and an anti-blocking agent such as synthetic silica.

In all the embodiments of the cover of the invention, each layer independently from the others constituting the cover has a thickness of between about 5 and about 13 microns.

The cover of the invention consists of a cylinder of about 50 cm in diameter and between about 140 cm and about 160 cm in height, perforated in its upper part for about 80 cm only.

BRIEF DESCRIPTION OF THE DRAWINGS

The invention will be better understood and its other aims and advantages will appear more clearly in the course of the explanatory description which will follow and which is made in reference to the schematic drawings appended in which.

DETAILED DESCRIPTION

The invention proposes a cover consisting of a plastic film with positive greenhouse effect, i.e. favouring the growth of bananas by an addition of heat through a reduction in the loss of heat by radiation at night and which by day allows all visible light and a good part of the UV "A" to pass and which absorbs UV "B" and reflects infrared (between 20 and 30%).

Thus a synergetic effect is obtained that enables more rapid growth of bananas to be obtained and at the same time an increase in the hardness of the banana's skin.

This is because it will be out of the question to increase the speed of growth of the fruit without giving the skin of the fruit sufficient strength to accept this growth.

Figure 1:
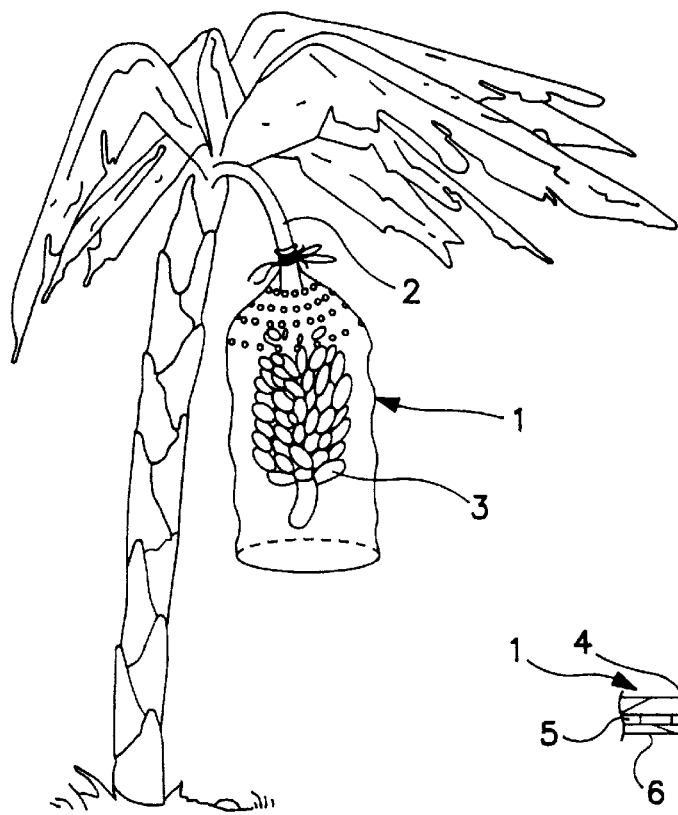
FIG. 1 is a view in perspective representing one method of using the cover of the invention.

Referring to FIG. 1 which shows a cover under the invention in use, it is seen that cover 1 has an outer surface in contact with the external environment and an inner surface in contact with the stalk of bananas (3).

Cover 1 is fastened by an appropriate means to the trunk of the banana plant.

Figure 2:
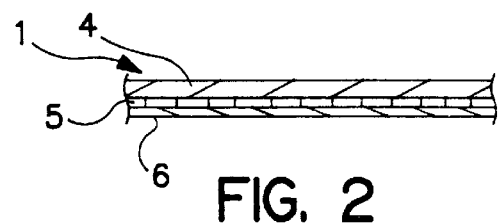
FIG. 2 is a view of a vertical look at the cover of the invention.

Cover 1 consists of a plastic multi-layer film illustrated in FIG. 2. The plastic film is of the type consisting of an outer layer 4, which is the layer in contact with the external environment, a central layer 5 and an inner layer 6 in contact with the stalk of bananas.

Cover 1 of the invention enables more rapid growth of the bananas, growth directly linked to the quantity of heat transmitted to the bananas, by means of the presence of the central layer 5 consisting of an ethylene and vinyl acetate copolymer that gives the plastic film a thermicity between 80% and 70%. The film thus reflects to the banana a part of the infrared re-emitted at night by the fruit while reflecting infrared by day to the exterior. This supplies an additional quantity of heat during the night.

The ethylene-vinyl acetate copolymers have adhesive properties that make their production difficult when the quantity by volume of vinyl acetate, as compared to the total volume of ethylene-vinyl acetate copolymer, exceeds 20%. It is thus preferred that the film's central layer 5 constituting the cover under the invention contains less than 20% by volume of vinyl acetate.

However, below 9% by volume of vinyl acetate, as compared to the total volume of ethylene-vinyl acetate copolymer, the positive greenhouse effect is lower.

The multi-layer plastic film used in the invention will thus preferably have a central layer 5 consisting of an ethylene-vinyl acetate copolymer containing between about 9% and 19%, by volume as compared to the total volume of copolymer, of vinyl acetate.

An addition of extra heat, i.e. a more rapid growth of the fruit, is thus ensured by the central layer of the cover under the invention containing the ethylene of vinyl acetate copolymer described above. The central layer, furthermore, protects by day, from infrared.

In addition, the cover under the invention absorbs harmful UV "B" while allowing a great part of the white light and UV "A" to pass.

To this end, the central layer of the cover under the invention can contain an ultraviolet absorbing agent that absorbs a good part of the ultraviolet "B" and thus inhibits blemishes due to UV "B". Profiting from all visible light wavelengths, the banana can absorb what it needs, the hardness of the skin is then increased, i.e. it has better resistance to impacts, injuries, the proliferation of various parasites and fungi.

Any appropriate agent absorbing UV "B" can be used in combination with the ethylene and vinyl acetate copolymer, a preferred UV "B" absorbing agent is an agent that not only absorbs UV "B" but also enables the ethylene and vinyl acetate copolymer to be stabilised to light, i.e. permitting it to keep its mechanical properties in spite of ultraviolet radiation, 2-hydroxy-4-n-octoxy-benzophenone. This light stabilising and UV absorbing agent is used to most advantage in combination with another light stabilising agent, poly-(N-β-hydroxyethyl-2, 2, 6, 6-tetramethyl-4-hydroxy-piperidyl succinate). Effective and sufficient quantities of the light stabilising and UV absorbing agent and of the light stabilising agent mentioned above consist of between 0.1 and 2% by volume for each of the agents as compared to the volume of ethylene and vinyl acetate copolymer.

It is also possible to add to the central layer an oleamide, currently used in plastic film technology to give slip qualities to plastic films.

As has already been emphasised, the central layer consists of an ethylene and vinyl acetate copolymer with adhesive properties that makes necessary the presence of an inner layer, in contact with the fruit, in order to stop the cover in use from adhering to the fruit. The inner layer should also be transparent to white light and UV "A". It can also contain a light stabilising and UV absorbing agent as well as a light stabilising agent, for example those contained in the central layer and in the same proportions as in the central layer. It should also be relatively soft so that it does not damage the fruit.

In a preferred method of carrying out the invention, the inner layer thus consists of a low density, radical polythene. A preferred polythene has a fluidity index greater than 4 $g/cm^2/mn$.

Advantageously, the inner layer in addition contains an anti-condensation agent.

The presence of this anti-condensation agent, by altering the film's surface tension properties, enables a uniform distribution of water from condensation on the film, and hence a better transmission of the visible spectrum and UV "A".

The anti-condensation agent on the inner surface also ensures an easier channelling of the water and hence a reduction in the risk of blemishes though the "magnifying effect". It also reduces the phenomenon of droplets on the fruit by enabling the water to channel away more easily.

All of this thus reduces the occurrence of scorching by reflection of moisture.

In other respects the presence of moisture on the stalk favours the development of Deightonella, a fungus harmful to bananas.

The presence of the anti-condensation agent thus also plays a part in the better growth of the banana and a better hardness of the banana's skin.

Any appropriate anti-condensation agent can be used in the inner layer but a preferred anti-condensation agent is mono-oleate glycerol.

The inner layer of the plastic film constituting the cover under the invention can also contain a slip agent such as amines and an anti-stick agent enabling avoidance of adhesion of the two inner surfaces of the cover under the invention, when stored and thus enabling the cover to be easily opened for use. A preferred anti-stick agent is synthetic silica.

Again because the ethylene and vinyl acetate copolymer composite of the central layer is adhesive, and to give better mechanical properties to the film forming the cover under the invention, the central layer is coated with an outer layer, i.e. that in contact with the ambient air, which should also allow white light and UV "A" to pass, as do the other layers.

Preferably the outer layer is composed of a low density, radical polythene having a fluidity index less than 1.5 $g/cm^2/mn$, so as to give the correct mechanical properties to the film for the cover under the invention.

In order to improve the properties of the cover under the invention, the outer layer can also include the same light stabiliser and UV absorber and associated light stabiliser as those included in the central layer, i.e. 2-hydroxy-4-n-octoxy-benzo-phenone associated with poly-(N-β-hydroxyethyl-2, 2, 6, 6-tetramethyl-4-hydroxy-piperidyl succinate) and in the same quantities as for the central layer.

Of course any other polymer and/or light stabilising and UV absorbing agents can be used in so far as they have the same function as the polythene and light stabilising and UV absorbing agents described above.

Optimally, in order to avoid the covers sticking to one another on storage, the outer film could include a slip agent such as an oleamide.

The film forming the cover for growing bananas under the invention is made in a manner in itself recognised in the trade, i.e. for example by co-extrusion in three layers. For preference, its production is controlled by computer in order to guarantee a stability and consistency of the thickness of each layer. This guarantees dose rate of constituents.

Preferably, the thickness of each layer constituting the film used in the invention is between about 5 and about 15 microns.

Figure 3:
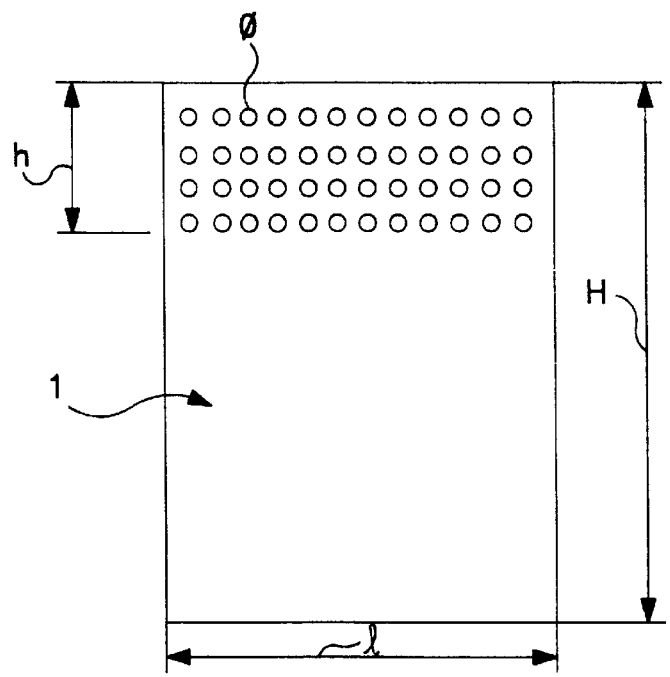
FIG. 3 is a side view of a cover upright according to a preferred embodiment of the invention.

As can be seen in FIG. 3, the covers under the invention will generally have the shape of a cylinder, of a diameter $\phi$ of about 50 cm and a height H between about 1.40 m and 1.60 m.

They can be perforated over the totality of their surface but, according to a preferred embodiment illustrated in FIG. 3, which shows a side view of an upright cover under the invention, the cover will only be perforated on its upper part to a height of about 80 cm. This provides a "chimney effect" that favours the evacuation of water to the outside and thus plays a part in reducing the risk of scorching through reflection of humidity, a magnifying effect and the reduction of risks of chlorosis by reduction of heat in the container during the day (by convection) and also by a permanent re-balancing of partial pressures of $CO_2$ and $O_2$.

According to one specific embodiment of the invention, the perforations will have a diameter of 8 mm and each perforation will be at a distance d from others of about 6 cm.

So that the invention's aims and advantages are better understood, several embodiments will now be described by way of examples that are purely illustrative and not limiting.

EXAMPLE 1

Trials were undertaken in Guadeloupe, using the cover under the invention, and for comparison the cover in blue polythene previously used by growers and also using no covers.

During a "June-July-August" growth period we measured the rate of growth of the fruit and hardness modulus of the skins when grown without a sleeve, with a sleeve in blue polythene previously used by growers and with the sleeve under the invention.

In this example, the sleeve under the invention was as follows:
- outer layer: thickness between 5 and 15 microns, composed of a low density, radical polythene with a fluidity index less than 1.5 $g/cm^2/mn$ and with a light stabiliser and UV absorber: 2-hydroxy-4-n-octoxy-benzophenone in an amount of 0.1 to 2% by volume as compared to the total volume of polythene; and a light stabiliser: poly-(N-β-hydroxyethyl-2, 2, 6, 6-tetramethyl-4-hydroxy-piperidyl succinate), in an amount of 0.1 to 2% by volume as compared to the total volume of polythene.

In addition, it includes an oleamide.
- central layer: thickness between 5 and 15 microns, composed of an ethylene and vinyl acetate copolymer containing between 9 and 19% by volume, as compared to the total volume of copolymer, of vinyl acetate, a light stabiliser and UV absorber: 2-hydroxy-4-n-octoxy-benzophenone, in an amount between 0.1 to 2% by volume as compared to the volume of copolymer, and a light stabiliser: poly-(N-β-hydroxyethyl-2, 2, 6, 6-tetramethyl-4-hydroxy-piperidyl succinate), in an amount between 0.1 to 2% by volume as compared to the total volume of copolymer.

In addition, it includes an oleamide.
- inner layer: thickness between 5 and 15 microns, composed of a low density, radical polythene with a fluidity index greater than 4 $g/cm^2/mn$ and with a light stabiliser and UV absorber: 2-hydroxy-4-n-octoxy-benzophenone in an amount between 0.1 to 2% by volume as compared to the volume of polythene, and a light stabiliser: poly-(N-β-hydroxyethyl-2, 2, 6, 6-tetramethyl-4-hydroxy-piperidyl succinate), in an amount of 0.1 to 2% by volume as compared to the total volume of polythene.

In addition, it contains synthetic $SiO_2$, amines and mono-oleate glycerol.

Hardness modulus measurements were made by measuring the pressure at the surface of the skin at a constant penetration speed of 2 mm/s with a pellet of 20 $mm^2$. Two series of trials were conducted: at an altitude of 300 m and at an altitude of 50 m and the bananas were cut at the same grade (diameter).

Table 1 below gives the results obtained at 300 m altitude and table 2 gives the results obtained at 50 m altitude.

TABLE 1

|  | without sleeve | sleeve of blue | sleeve under the invention |
| --- | --- | --- | --- |
| Rate of growth of diameter (in | 0.18 | 0.22 | 0.29 |
| hardness modulus (in g) | 1550 | 1550 | 1550 |

From the results obtained at 300 m altitude, it can be seen that the rate of growth of bananas increases with the use of the cover under the invention and that the hardness of the skin remains constant. It must be noted here that the skin hardness modulus was already very high at this altitude.

TABLE 2

|  | without sleeve | sleeve of blue | sleeve under the invention |
| --- | --- | --- | --- |
| Rate of growth of diameter (in | — | 0.26 | 0.29 |
| hardness modulus (in g) | — | 1280 | 1480 |

From the results obtained at 50 m altitude, a lesser increase is observed in the rate growth of fruit and a steep increase in the skin hardness modulus.

But the fruit's rate of growth is already very substantial on the plain and one of the problems encountered in this area is the low skin hardness modulus of the fruit. Using the cover under the invention thus enables a clear increase in the skin hardness modulus, i.e. solving problems encountered at 50 m altitude and in addition increasing the growth rate of the fruit.

Generally speaking, from the results obtained in this example, a significant reduction is seen in the type of difference in the criteria measured: the hardness modulus tends to become "uniform", between 1450 and 1550 g, and the rate of growth increases to 0.29 mm/day.

But, in a more important manner, the cover under the invention can be adapted to different sites where bananas are grown.

This can be done through varying the quantity of UV absorber or by using its presence or absence in the various layers composing the cover under the invention.

This is because the UV absorber used in the invention transforms UV "B" into heat, i.e. into infrared and the copolymer making up the central layer in vinyl-ethylene acetate reflects this infrared.

This means that according to the sunnyness of the day, i.e. the amount of sunshine and the period of sunshine, these rates and periods themselves depending on season and altitude, for example the composition of the cover under the invention can be adapted to obtain a better fruit growth rate increase/skin hardness increase ratio.

For example, it was seen in example 1 that in the area called "the plain", i.e. at an altitude of less than 100 m, the growth rate of the fruit is already substantial and that the problem encountered is the one of a low skin hardness of the fruit. Consequently in this area one will seek more to promote an increase in skin hardness than fruit growth. The additional supply of heat due to the transformation of UV "B" into heat is thus not necessary.

In such a case a cover under the invention can be chosen that contains the light stabilising and UV absorbing agent (with the associated light stabilising agent) only in the central layer and/or the outer layer.

With this configuration UV "B" is absorbed and transformed into heat (IR) when it passes through the outer layer. And the vinyl acetate-ethylene copolymer contained in the central layer reflects this additional supply of heat to the exterior, by day.

Of course at night the infrared emitted by the fruit will be reflected back to the fruit by the central layer containing the ethylene-vinyl acetate copolymer.

However, in the area called "mountain", i.e. at an altitude of more than 100 m, the hardness of the skin is already satisfactory but, on the other hand, the growth rate of the fruit is low. In this instance it is thus very advantageous to have an additional supply of heat due to the transformation of UV "B" into heat (IR). It is then especially preferable to use, in mountain areas, a cover containing the light stabilising and UV absorbing agent (with the associated light stabilising agent) only in the inner layer and/or the central layer.

In this configuration UV "B" rays cross the central layer, are transformed into heat (IR) in the central layer and/or the inner layer and the presence of the vinyl acetate-ethylene copolymer in the central layer will reflect, by day, this supply of additional heat to the fruit.

Summarising, the combination of a central layer consisting of a material with positive greenhouse effect, here ethylene-vinyl acetate copolymer, with a UV absorber contained either in the three layers forming the cover under the invention, or in one of these layers alone, enables the cover under the invention to be adapted to all of the climate situations encountered in growing the fruit.

In the case where the cover under the invention contains a light stabilising and UV absorbing agent (with the associated light stabilising agent) only in the central layer, when appropriate with regard to climate conditions, this cover will present the advantage that the inner layer, i.e. the one in contact with the fruit, will serve as an "insulating" layer as compared to the central layer in ethylene-vinyl acetate copolymer, which will itself be warm.

The following example illustrates other advantages of the invention.

EXAMPLE 2

Trials were undertaken on plants (first cycle) that are in plantations recognised as fragile, in two places, namely on the plain (altitude 30 m) and in the mountains (altitude 250 m).

The growing period was from September to December which is the time of year the most favourable for growing bananas, but in that year, there were problems of drought, particularly on the plain.

Observations were made by comparing certain criteria between stalks grown under a blue sleeve as previously used and stalks grown under a sleeve in the invention for the same flower-cut interval (FCI). The flower-cut interval is the period of time that elapses between flowering of the banana plant and cutting the bananas.

The criteria measured and results obtained are given below in Table 3.

In the table, the difference in grade represents the difference in the diameter of the fruit measured by a calliper gauge between fruit grown with the previously used blue cover and with the cover under the invention.

In similar fashion, the difference in length was measured of fruit obtained with the previously used blue cover and with the cover under the invention. The differences in weight, hardness and firmness of fruit obtained with the previously used blue cover and with the cover under the invention are also given.

On the plain, the cover under the invention contained the light stabilising and UV absorbing agent and the associated light stabilising agent described in Example 1 only in the central layer and outer layer whereas at altitude, the cover under the invention contained the light stabilising and UV absorbing agent and the associated light stabilising agent described in Example 1 only in the central layer and inner layer.

The invention's other characteristics were identical to those for the cover used in Example 1.

TABLE 3

|  | Growing on the plain 75 day FCI | Growing at altitude 86 day FCI |
| --- | --- | --- |
| difference in grade | +1 nm | +1.5 mn |
| difference in length | Hand 1 = +1 cm<br>Hand 7 = +0.3 cm | Hand 1 = +1.4 cm<br>Hand 7 = +0.8 cm |
| difference in weight | Hand 1 = +22 g/finger<br>Hand 6 + 9 g/finger | Hand 1 = +19 g/finger<br>Hand 6 = +12 g/finger |
| hardness | Cover under the invention > blue cover | Cover under the invention > blue cover |
| firmness | Cover under the invention > blue cover | Cover under the invention > blue cover |

Also, with the cover under the invention, photosynthesis activity is more substantial than with the blue polythene covers.

The fruit's pistils (tip of the banana's male inflorescence) disappeared on the stalks covered with the cover under the invention. Removing pistils is a paid task on banana plantations. Absence of the need to remove pistils thus results in enormous savings.

The bananas lengthen more rapidly which allows a greater opening of the hands at the bottom of the stalk and thus avoids damage of one hand by another. Waste of one hand/stalk (i.e. about 1 kg) is estimated due to this type of damage.

Although ripening more quickly, physiologically the bananas are younger. This enables:

either the bananas to be left longer on the plant and thus heavier fruit to be obtained (+11% in weight per week), or to benefit from the additional time to allow the bananas to travel without problems of premature ripening or a combination of both advantages.

Of course the invention is not limited to the embodiments described and illustrated which have only been given by way of examples.

Hence any plastic film or combination of films with positive greenhouse effect, absorbing UV "B", allowing UV "A" and white light to pass could be used to make a cover under the invention.

In addition, the cover under the invention could be used for growing fruit other than bananas, if appropriate.

This is the case, in general, for any growing system having a significant photosynthesis activity and of a size compatible with the use of plastic covers. Mentionable in particular are vine stocks, stalks of dates, some *cucurbita* (gourd family), any fruit on stalks or in bunches and any small sized bushes.

Furthermore, the cover under the invention should have a very effective role in stimulating the growth of offshoots on banana plants when placed on the offshoots.

In all these applications, only the form of the cover changes and the various concentrations.

Of course, the cover under the invention could also have other dimensions than those described here.

On the contrary, the invention comprises all the technical equivalents for the means described as well as their combinations if they are done in the same spirit.

I claim:

1. A cover for growing plants comprising a multi-layer plastic film including an outer layer, a central layer and an inner layer, the central layer comprising an ethylene and vinyl acetate copolymer and at least one of the layers comprising at least one light stabilizing and ultraviolet absorbing agent.

2. A cover as claimed in claim 1 wherein the ethylene and vinyl acetate copolymer comprises less than 20% by volume of vinyl acetate as compared to the total volume of the copolymer.

3. A cover as claimed in claim 1 wherein the ethylene and vinyl acetate copolymer comprises between about 9% and about 19% by volume of vinyl acetate as compared to the total volume of the copolymer.

4. A cover as claimed in claim 1 wherein the light stabilizing and ultraviolet absorbing agent comprises 2-hydroxy-4-n-octoxy-benzophenone, the cover further comprising poly-(N-β-hydroxyethyl-2,2,6,6-tetramethyl-4-hydroxy-piperidyl succinate) as a light stabilizing agent, each in an amount of 0.1 to 2% by volume as compared to the total volume of the copolymer.

5. A cover as claimed in claim 1 wherein each of the three layers comprises at least one light stabilizing and UV absorbing agent.

6. A cover as claimed in claim 1 wherein only the central layer comprises the at least one light stabilizing and UV absorbing agent.

7. A cover as claimed in claim 1 wherein only the outer layer comprises the at least one light stabilizing and UV absorbing agent.

8. A cover as claimed in claim 1 wherein only the inner layer comprises the at least one light stabilizing and UV absorbing agent.

9. A cover as claimed in claim 1 wherein the central layer and outer layer each comprise the at least one light stabilizing and UV absorbing agent.

10. A cover as claimed in claim 1 wherein the central layer and inner layer each comprise the at least one light stabilizing and UV absorbing agent.

11. A cover as claimed in claim 1 wherein the inner layer further comprises an anti-condensation agent.

12. A cover as claimed in claim 1 wherein the central layer further comprises a slip agent.

13. A cover as claimed in claim 1 wherein the outer layer comprises a low density, radical polyethylene having a fluidity index less than about 1.5 $g/cm^2/mn$ and the inner layer comprises a low density, radical polyethylene having a fluidity index greater than about 4 $g/cm^2/mn$.

14. A cover as claimed in claim 1 wherein the outer layer further comprises a slip agent, and the inner layer further comprises a slip agent and an anti-stick agent.

15. A cover as claimed in claim 1 wherein each layer of the multi-layer plastic film has a thickness between about 5 and about 15 micrometers.

16. A cover as claimed in claim 1 wherein the cover is cylindrical with a diameter of about 50 cm, has a height of between about 140 cm and 160 cm, and is perforated only on an upper part thereof over about 80 cm.

17. A method of using the cover according to claim 1 for growing vines, dates, or *cucurbita*.

18. A method of using the cover according to claim 1 to accelerate growth of offshoots from banana plants.

19. A cover as claimed in claim 1 wherein the inner layer comprises an anti-condensation agent, the anti-condensation agent comprising mono-oleate glycerol.

20. A cover as claimed in claim 1 wherein the central layer further comprises a slip agent, the slip agent comprising oleamide.

* * * * *